(12) United States Patent
Jenko et al.

(10) Patent No.: US 7,549,855 B2
(45) Date of Patent: Jun. 23, 2009

(54) NOZZLE TIP FOR HIGH MELT PRESSURE APPLICATIONS

(75) Inventors: Edward Joseph Jenko, Essex, VT (US); Sohail Mohammed, Colchester, VT (US)

(73) Assignee: Husky Injection Molding Systems Ltd., Bolton, Ontario (CA)

( * ) Notice: Subject to any disclaimer, the term of this patent is extended or adjusted under 35 U.S.C. 154(b) by 123 days.

(21) Appl. No.: 11/737,773

(22) Filed: Apr. 20, 2007

(65) Prior Publication Data

US 2008/0260889 A1    Oct. 23, 2008

(51) Int. Cl.
*B29C 45/20* (2006.01)
(52) U.S. Cl. .................. 425/549; 264/328.15
(58) Field of Classification Search .............. 425/549; 264/328.15
See application file for complete search history.

(56) References Cited

U.S. PATENT DOCUMENTS

| 6,164,954 | A | 12/2000 | Mortazavi et al. |
| 7,018,197 | B2 | 3/2006 | Babin et al. |

FOREIGN PATENT DOCUMENTS

CA    2332062  A1    7/2002

*Primary Examiner*—Tim Heitbrink

(57) ABSTRACT

An improved nozzle for high melt pressure applications includes an inner body portion having a melt channel, the inner body portion having an inlet face and a melt outlet; an outer body portion having a seal face, with the outer body portion inducing a compressive force on the inner body portion at least during operation of the nozzle; the plane of the inlet face of the inner body portion intersecting the outer body portion, resulting in no part of the inner body portion extending beyond the seal face of the outer body portion; and the inner and outer body portions having different relative thermal conduction and expansion coefficients.

25 Claims, 4 Drawing Sheets

NOZZLE TIP FOR HIGH MELT PRESSURE APPLICATIONS

CROSS REFERENCES

None.

TECHNICAL FIELD OF THE INVENTION

The present invention relates generally to the field of injection molding equipment and, more particularly, to an improved high melt pressure nozzle tip.

BACKGROUND OF THE INVENTION

"Thin-walled" nozzle tips are desired for use in injection molding applications due to their small size, which allows the use of multiple nozzle tips within a single mold, for example, in high cavitation applications. In order to provide the material properties required for these applications, thin-walled nozzle tips are typically formed from concentric portions composed of different materials. The inner portion, which contains the channel through which molten material is delivered to the mold, must be made from a highly thermal conductive material. Such materials generally have relatively poor strength characteristics. To protect the low strength inner portion, the outer portion is preferably manufactured from a significantly higher strength material. An example of a concentrically formed, thin-walled nozzle tip is described in U.S. Pat. No. 6,164,954.

A significant drawback of these designs is the fact that highly conductive, low strength inner portion forms the sealing face between the nozzle tip and the nozzle housing in which the tip is mounted. In particular, as shown in U.S. Pat. No. 6,164,954, these designs incorporated an inner portion having a flange that extends above the outer portion. This flange seats directly against the nozzle housing. This arrangement leads to the inner portion being directly exposed to extremely high melt pressures, exceeding 40,000 psi, and load transmissions from torque applied to the threaded joints of the nozzle tip. Because the inner portion is made from a relatively low strength material, it frequently fails under these conditions in the form of seal failure and cracks that ultimately result in plastic leakage.

It would be desirable to provide an improved thin-walled injection nozzle tip capable of withstanding high melt and torque pressures without failure of the highly conductive, low strength inner portion of the nozzle tip.

It would also be desirable to provide the sealing function to the nozzle housing with the higher strength outer portion and by doing so, there is one less interface to seal, since the inner portion flange of the prior art is eliminated from the sealing assembly.

The present invention is directed to meeting one or more of the above-stated desirable objectives.

SUMMARY OF THE INVENTION

One aspect of the present invention is to provide an improved injection nozzle suitable for use in high melt pressure applications having enhanced wear and fatigue failure resistance.

Another aspect of the invention is to provide an improved injection nozzle that may be made with substantially thinner walls, resulting in the ability to accommodate even more units in a mold, by reducing the amount of torque and melt pressures and hoop stresses experienced at the melt channel of the nozzle.

Yet another aspect of the invention is to provide an improved injection nozzle for high melt pressure applications in which the highly conductive but low strength melt channel is protected from torque and melt pressure by minimizing or eliminating sealing face contact between the melt channel and the nozzle housing.

Yet another aspect of the invention is to provide an improved injection nozzle with a reduced number of sealing interfaces.

In accordance with the above aspects of the invention, there is provided, an improved nozzle for high melt pressure applications that includes an inner body portion having a melt channel, the inner body portion having an inlet face and a melt outlet; an outer body portion having a seal face, with the outer body portion inducing a compressive force on the inner body portion at least during operation of the nozzle; the plane of the inlet face of the inner body portion intersecting the outer body portion, resulting in no part of the inner body portion extending beyond the seal face of the outer body portion; and the inner and outer body portions having different relative thermal conduction and expansion coefficients.

In yet another embodiment, the compressive force exerted on the inner body portion is induced through an interference fit or, alternately, a shrink fit, between the inner and outer body portions at room temperature.

In an alternate embodiment, the compressive force is induced through relative thermal expansion between the inner and outer body portions during operation of said nozzle. Further, an inner surface of the outer body portion is provided with an inwardly extending concentric shelf that engages with an outwardly extending concentric shoulder on an exterior surface of the inner body portion to limit further longitudinal movement of said inner body portion relative to said outer body portion while the portions are at room temperature. In addition, the inlet face of the inner body portion is recessed from the seal face of the outer body portion to allow for longitudinal expansion of the inner body portion.

These aspects are merely illustrative of the various aspects associated with the present invention and should not be deemed as limiting in any manner. These and other objects, aspects, features and advantages of the present invention will become apparent from the following detailed description when taken in conjunction with the referenced drawings.

BRIEF DESCRIPTION OF THE DRAWINGS

Reference is now made to the drawings which illustrate the best known mode of carrying out the invention and wherein the same reference numerals indicate the same or similar parts throughout the several views.

DETAILED DESCRIPTION

In the following detailed description, numerous specific details are set forth in order to provide a thorough understanding of the invention. However, it will be understood by those skilled in the art that the present invention may be practiced without these specific details. For example, well-known methods, procedures, and components have not been described in detail so as not to obscure the present invention.

Figure 1:
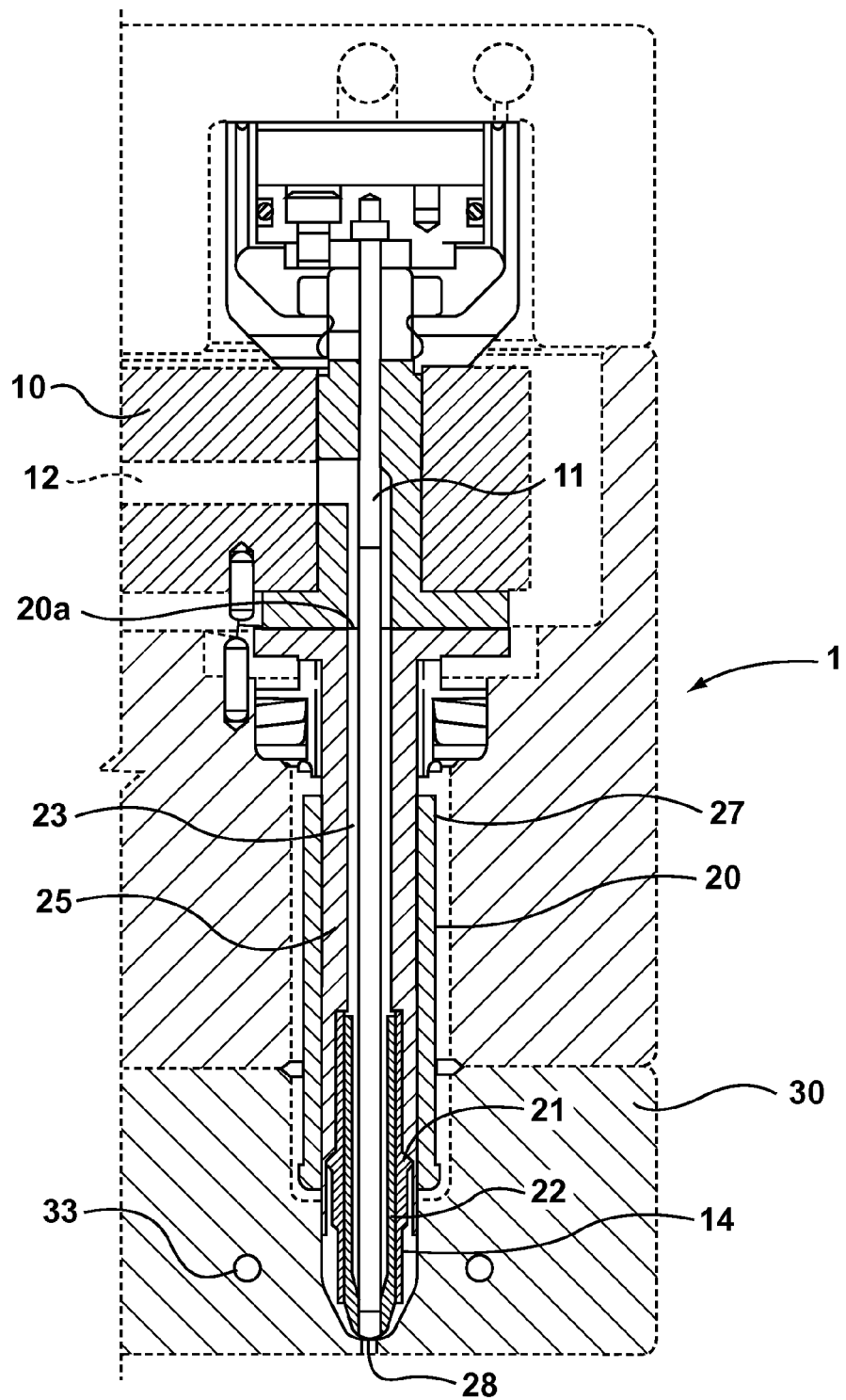
FIG. 1 is a cross-sectional view of a molding system incorporating a nozzle tip according to a first embodiment of the invention.

FIG. 1 illustrates the overall arrangement of an injection molding device 1. The device includes a mold manifold 10, having manifold melt channel 12 through which molten material reaches injection nozzle 20. While FIG. 1 shows valve stem 11 for regulating the flow of material through the melt channel, it should be noted that embodiments of the current invention may be used with any nozzle configuration including known thermal gating designs. In most applications several nozzles similar to nozzle 20 communicate with a plurality of melt channels 12 to improve productivity. That is, FIG. 1 shows only one part of a mold that may have several nozzles. In order to minimize the overall size of the mold, the injection nozzles must be very small in diameter. This means that nozzle tip apparatus 14 must have a small diameter. To reduce the diameter of the nozzle tip portion, the nozzle tip portion should be "thin-walled."

Nozzle 20 has an opening at its proximal end, or "head portion", identified by reference numeral 20a, for receiving the molten material from the manifold. The nozzle feeds the material through melt channel 23, communicating with manifold melt channel 12, to nozzle tip apparatus 14 at its distal end, having an orifice 28 leading from the melt channel to a mold cavity (not shown). Heater 27, provided along the nozzle, heats nozzle 20 to maintain the material in the melt channel in a molten state. During the molding step, the nozzle injects the molten material through the orifice 28 and a mold gate (not shown) into a mold cavity space (not shown) located in mold plate 30, using known methods. The mold 30 plate includes cooling channels 33 to carry a cooling fluid to cool the mold gate area after each injection step.

The features of nozzle 20, and in particular, nozzle tip apparatus 14, described below, are useful for high pressure injection molding and accommodate the need to use several nozzles within a limited space. In the preferred embodiment, the materials used for, and the assembly of, the apparatus components result in a nozzle tip apparatus of improved durability under high pressure, high temperature molding conditions, and under chemical interaction with the molten material.

Figure 2A:
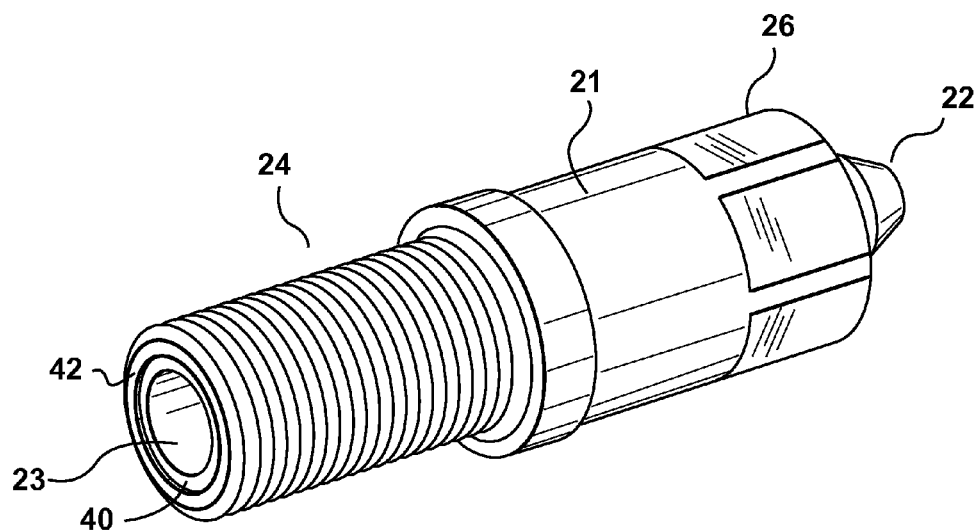
FIGS. 2a and 2b are perspective views of a nozzle tip according to another embodiment.
Figure 2B:
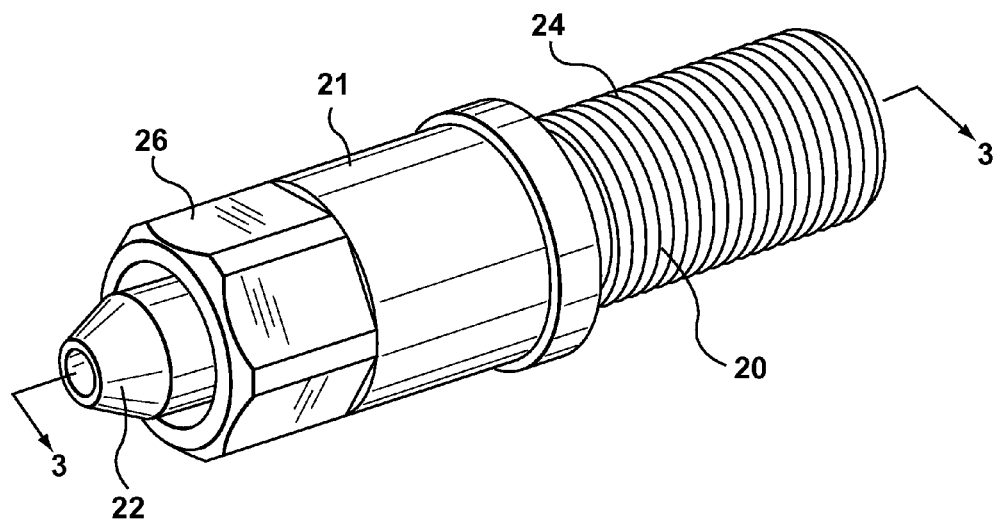
Figure 3:
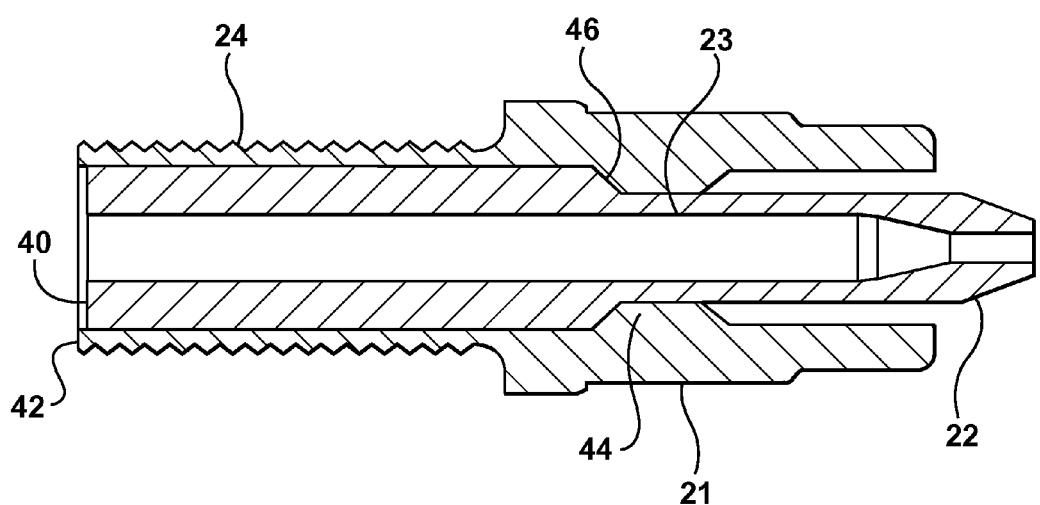
FIG. 3 is a cross-sectional view of the nozzle tip illustrated in FIGS. 2a and 2b.

FIGS. 2a, 2b, and 3 illustrate nozzle apparatus 20 in more detail. The nozzle apparatus includes an outer portion 21 surrounding at least part of an inner portion 22. The two portions are coaxial, generally tubular structures having substantially thin walls. The inner portion may taper in a generally conical fashion at the end nearest orifice 28. Melt channel 23 formed within the inner portion guides molten material from the head portion 20a to the mold cavity space in the mold plate 30. The melt channel ends with a single orifice 28 at the tip end of the nozzle. Various tip end configurations can be successfully used in conjunction with the current invention, such as, for example, edge gating, torpedo, mixer, or divert and the flow of molten material can be regulated using either mechanical or thermal means.

Suitable manufacturing methods for the inner portion made of carbides include powder injection molding or other known manufacturing methods. Manufacturing the inner portion requires accurately machining outer diameter D1 to a precise tolerance to create the interference fit required to induce the necessary pre-load in assembling the two portions 21 and 22.

According to one embodiment of the current invention, the outer portion of the nozzle has an inner diameter D2 that is slightly smaller than the outer diameter D1 of the inner portion. As mentioned above, this creates an interference fit between the two pieces when assembled together. This interference fit places a compressive pre-load upon the inner portion from the pressure of the outer portion. This compressive pre-load counteracts the outward pressure on the inner portion created by the injection pressure. This reduces the total stress on the inner portion, because the total stress experienced by the inner portion is the algebraic sum of the injection pressure exerting a force radially outward against the inner surface of the inner portion and compression force exerted radially inward on the outer surface of the inner portion by the fitted outer portion. The pre-load makes thus possible to make the two portions 21 and 22 with relatively thin walls and to use the two assembled pieces for high injection pressure.

According to the instant invention the load or pre-load between the inner and the outer bodies can be created in at least three ways. In one method, referred to herein as a press-fit, the outer body 21 has diameter D1 smaller than the outer diameter D2 of inner body 22. A pre-load is generated at the interface between these portions according to the invention by pressing, at room temperature, outer body 21 over inner body 22. In a second method, outer body 21 is heated to increase its inner diameter, and then is assembled at room temperature over inner body 22. During cooling at room temperature, the outer body shrinks, generating the interference fit or pre-load at the interface with the inner body. This method is referred to herein as a shrink-fit. A third method creates a load at the interface between 21 and 22 by making inner body 22 of a material having higher thermal expansion coefficient than outer body 21. The inner and outer diameters of body 21 and 22 are almost equal so that they can be assembled at room temperature. The outer body applies almost no pre-load on the inner body at room temperature. In operation, as the temperature rises before and during injection, the inner and outer bodies expand at different rates so that the outer body, which expands less than the inner body, exerts a pre-load on the inner body during the molding process.

As can be readily seen in FIG. 3, the lateral face 40 of the inner portion 22 at the end opposite the orifice 28 does not extend beyond the lateral face 42 of that end of the outer portion 21, in contrast to the prior art. The lateral face 42 of the outer portion 21 thus provides the sealing face of the nozzle tip 14 when it is mated with the nozzle housing 25. This arrangement minimizes or eliminates contact of the inner portion 22 and the nozzle housing 25 and ensures that the outer portion 21, which is advantageously made of a higher strength material than the inner portion 22, bears the brunt of the torque and melt pressures exerted on the nozzle tip 14. The resulting reduction in pressures exerted on the inner portion 22 reduces incidents of failure of the inner portion, which can cause cracking and eventual leakage. Furthermore, the reduction of stresses exerted on the inner portion allows for even thinner wall arrangements of the nozzle tip.

In the embodiment illustrated in FIGS. 2a, 2b, and 3, the lateral face 40 of the inner portion 22 is recessed from the lateral face 42 of the outer portion 21. This arrangement is particularly suitable for what is referred to herein as a "two-piece" nozzle tip design. The two-piece embodiment refers to nozzle tips 14 manufactured using the third method of pre-loading the portions described, supra, in which the inner and outer bodies expand at different rates so that the outer body, which expands less than the inner body, exerts a pre-load on the inner body during the molding process. During the molding process, the inner portion, in addition to expanding radially, expands longitudinally. The recess of the lateral face 40 of the inner portion 22 from the outer portion 21 allows for such longitudinal expansion of the inner portion so that the inner portion does not extend beyond the lateral face 42 of the outer portion following such expansion, thereby allowing the outer portion 21 to maintain a tight contacting seal against plastic leakage while under high injection pressure. If the inner portion 22 was allowed to expand hard against the nozzle housing 25, it would diminish contact sealing stress provided by outer portion 21 and reduce leakage resistance. In addition, not allowing the inner portion 22 to extend beyond the lateral face 42 of the outer portion serves to maintain the pressure reduction benefits of the pre-load described in the present invention in this embodiment. As described above, when this method of pre-loading the inner body is utilized, there is almost no pre-load exerted at room temperature. Therefore, it is advantageous to provide retention means to limit movement of the inner portion relative to the outer portion.

A suitable retention means is illustrated in FIG. 3. The interior cylindrical surface of the outer portion 21 is provided with a concentric, inwardly directed projection or shelf 44. The exterior surface of the inner portion 22 is provided with a corresponding concentric shoulder 46. In one embodiment, the shoulder 46 represents a transitional surface from larger exterior diameter section of the inner portion to a smaller diameter section. When the inner and outer portions are assembled, the shelf 44 of the outer portion engages the shoulder 46 of the inner portion to limit further longitudinal movement of the inner portion relative to the outer portion.

In the embodiments utilizing the first and second methods of pre-loading the inner body, which result in a pre-load being exerted on the inner body at room temperature, (and referred to herein as "one-piece" designs) the pre-loading itself serves as the primary means of retaining the assembled relationship of the inner and outer portions. Therefore, the shoulder and shelf arrangement described previously is not necessary in these one-piece embodiments. However, those of skill in the art will recognize that this arrangement may be incorporated into the one-piece embodiments as a secondary retention means.

Materials used for outer portion 21 preferably exhibit high pressure resistance and good thermal conductivity. Materials having both characteristics include steel, TZM (Ti/Zr-carbide manufactured by Plansee), AerMet 100®, from Carpenter Technology Corp. of Reading, Pa., or other materials having similar or better characteristics. AerMet alloy, particularly AerMet 100, demonstrates a favorable combination of strength and fracture toughness among commercial UHS steel. Using AerMet 100 prevents premature cracking or breaking under heavy load or impact. Also AerMet®-for-Tooling alloy can be heat treated to 280-300 ksi tensile strength while exhibiting Charpy-V-notch in excess of 30 ft-lbs at HRC 54. It is fully hardenable, and virtually free of distortion when heat treated. The importance of very low distortion, becomes important with critical size tolerances such as those required in the current invention for the diameters of the nozzle bodies.

In one embodiment, outer body 21 includes a fastening or connecting portion. For example, FIGS. 2a, 2b, and FIG. 3 illustrate threaded area 24 located on a portion of the outer surface of outer body 21. The nozzle apparatus fastens to nozzle housing 25 (shown in FIG. 1) surrounding the nozzle using threading 24. Hex portion 26 formed on the outer surface of the outer portion facilitates fastening and unfastening the nozzle tip apparatus from the nozzle housing.

Materials used for the inner portion 22 preferably exhibit excellent thermal conductivity. Materials having suitable thermal conductivity characteristics include, among others, beryllium copper.

Accordingly, in some applications the pressure load generated at the interface between the two bodies creates an assembly that withstands high pressure injection.

This novel design and method of inducing a pressure load in high temperature molding operation may be achieved by many combinations of materials with different thermal expansion coefficients. As an example, the inner portion may be made of a thermally conductive carbide and the outer portion may be made of a variety of high-strength, pressure resistant materials, such as steel, AerMet, or a similar combination. In some applications the outer body can be made of Inconel 600 or Inconel 690 material, which is known in the high pressure reactor vessels art and applications. Inconel is a registered trade mark of the INCO family of companies and is supplied in various forms (tube or rod) by High Performance Alloys, Inc. of Tipton, Ind. Inconel alloy 600 is nickel-chromium alloy designed for use from cryogenic to elevated temperatures (up to 2000 deg. F.). It has excellent mechanical properties and high strength. It resists to a wide range of abrasive and corrosive media.

In another embodiment of the invention, the inner body is made of a high thermally conductive material such a BeCu 25 that has an inner coating or layer made of a wear resistant material selected from a group consisting of nickel, molybdenum, titanium and tungsten carbide. The inner layer could be also made of ceramics such as alumina, zirconia, silicon carbide, silicon nitride and boron carbide. These materials are commercially available and can be applied using various techniques, as described in the brochures of Dynamic-Ceramic Ltd. located in Crewe, UK. A useful high strength and high hardness material that can be used for the inner body is a sintered ceramic made of alumina-zirconia-silicon (in certain proportions), as disclosed in the U.S. Pat. No. 4,746,635 to Inoue et al. As discussed above, the inner body must have a high thermal expansion coefficient. The outer body is made of a high pressure material that has a lower thermal expansion coefficient. This combination of materials for the two bodies is capable of creating a pressure load through different thermal expansion when they are assembled together and used in an injection nozzle apparatus.

In conclusion, the current invention provides at least three methods of making a multiple piece nozzle apparatus for high pressure molding, preferably a two-piece assembly, where the outer portion places a compressive preload on the entire inner portion. The magnitude of the preload depends on the degree of interference between the inner and outer portions. The appropriate interference between the inner and outer portions will depend on the materials selected for each portion and can be calculated by a person skilled in the art. For example, if the inner portion is carbide and the outer portion is TZM, the interference may be, for example, in the range of 0.02 to 0.03 mm. Because of the difference in thermal expansion of the Aermet and carbide, a larger preload should be placed on the carbide to ensure that in the hot condition, the interference fit is still present. For example, the interference between an inner carbide portion and an outer Aermet portion may be for example in the range of 0.06 to 0.07 mm before heating.

Other considerations in shrink fitting the outer portion to the inner portion include the difference in temperature required for assembly, resistive holding torque of the inner portion, and the pressure at the interface between the outer surface of the inner portion and the inner surface of the outer portion. In addition, more general considerations include the effect of the preload on the tip, that is, the torque/force required to seat the tip, thermal stresses caused by the raising the nozzle assembly to the required operating temperature, and the stiffness of the nozzle housing.

Optimizing the performance of the nozzle tip assembly also requires selecting an appropriate melt channel diameter as well as an appropriate ratio between the inner diameters D1 and D2. The melt channel must be sized to withstand a pressure drop through the nozzle tip assembly, and to meet the flow requirements for the intended application. For example, the melt channel may have a diameter of 7.00 mm when the injection pressure is 50 ksi. With these parameters, the stress on the inner portion will vary along the inner portion on the inner and outer surfaces of the straight and the tapered sections of the inner portion. In addition, the ratio between the diameters D1 and D2 must be selected to withstand high injection molding pressures of about 50 ksi at high temperatures of about 600-800 degrees F.

As mentioned before, according to this invention the nozzle tip 14, even though is made of two pieces connected together, can be regarded as one piece made of two different materials where a pressure pre-load or a pressure load is at the interface between the two materials. This design approach helps the service and assembly operations as the nozzle tip can be easily connected to the nozzle 20 through any useful means such as a thread.

Figure 4:
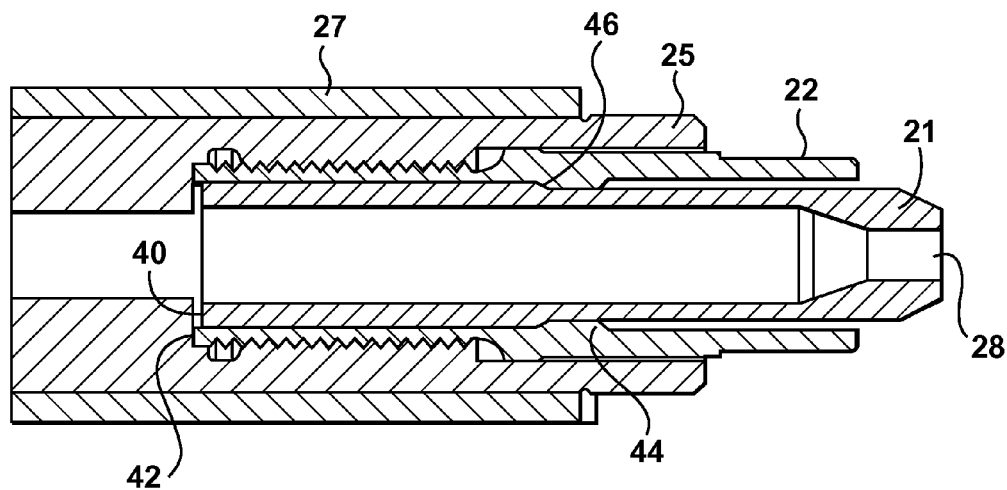
FIG. 4 is cross-sectional view of a molding system incorporating a nozzle tip according to another embodiment.
Figure 5:
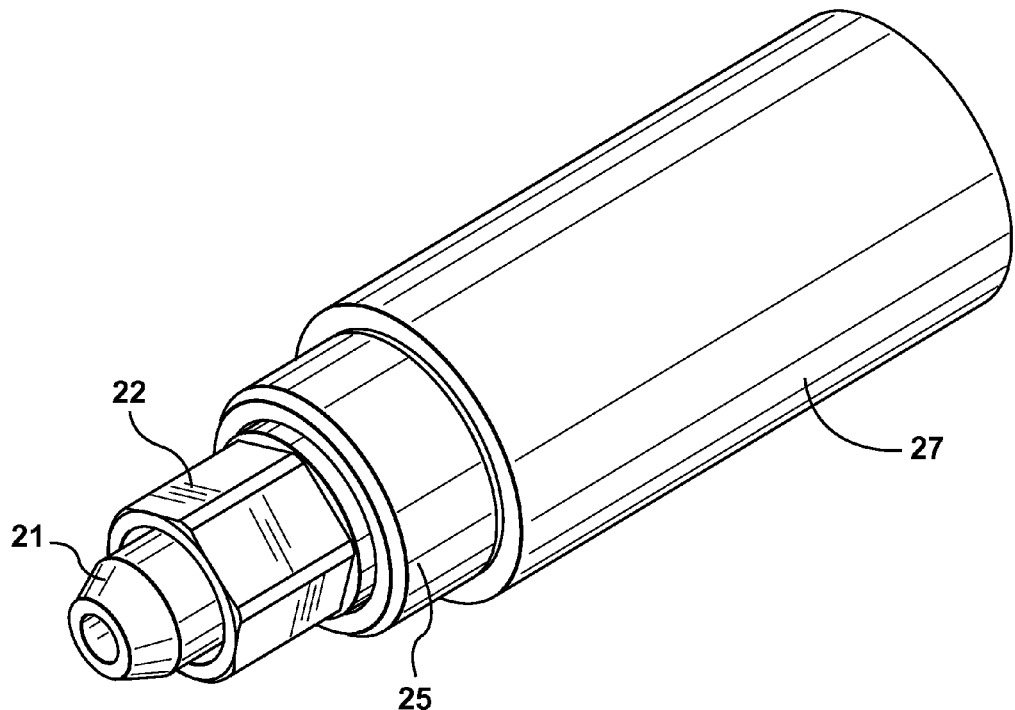
FIG. 5 is a perspective view of the nozzle tip illustrated in FIG. 4.

FIG. 4 illustrates a cross section through an injection nozzle according to the invention incorporating an external heater 27 surrounding the nozzle housing 25 to maintain the material flowing in the melt channel molten. Other embodiments of the nozzle tip apparatus include apparatuses having a different geometry of the inner body 21, including divert, torpedo or edge gating.

As those of skill in the art will appreciate, the nozzle tip embodiments of the present invention may be utilized in all typical injection molding systems without the need for modification of those systems. U.S. Pat. No. 6,164,954 describes further suitable applications and is expressly incorporated by reference herein.

Other objects, features and advantages of the present invention will be apparent to those skilled in the art. While preferred embodiments of the present invention have been illustrated and described, this has been by way of illustration and the invention should not be limited except as required by the scope of the appended claims and their equivalents.

We claim:

1. An injection nozzle, comprising:
   a nozzle body having a first end and a second end;
   an inner body portion comprising a first material and including a melt channel, said inner body portion having a inlet face at a first end and a melt outlet at an opposite end;
   an outer body portion comprising a second material, said outer body portion having a seal face at a first end and a seal surface at a second end for sealing with the nozzle body, said outer body portion inducing a compressive force on said inner body portion at least during operation of said nozzle;
   a plane of said inlet face of said inner body portion intersecting said outer body portion, resulting in no portion of said first end of said inner body portion extending beyond said seal face of said outer body portion; and
   said first material having first thermal conduction coefficient and a first thermal expansion coefficient, said second material having a second thermal conduction coefficient and a second thermal expansion coefficient, at least one of said first thermal conduction coefficient and said first thermal expansion coefficient greater than said corresponding second thermal conduction and expansion coefficients of said second material.

2. The injection nozzle as set forth in claim 1, wherein:
   said compressive force is induced through an interference fit between said inner and said outer body portions at room temperature; and
   said inlet face of said inner body portion and said seal face of said outer body portion are generally coplanar.

3. The injection nozzle as set forth in claim 1, wherein:
   said compressive force is induced through a shrink fit between said inner and said outer body portions at room temperature; and
   said inlet face of said inner body portion and said seal face of said outer body portion are generally coplanar.

4. The injection nozzle as set forth in claim 1, wherein:
   said inlet face of said inner body portion is recessed from said seal face of said outer body portion; and
   said compressive force is induced through relative thermal expansion between said inner and said outer body portions during operation of said nozzle.

5. The injection nozzle as set forth in claim 3, wherein said outer body portion further comprises an inner surface having an inwardly extending concentric shelf;
   said inner body portion further comprising an exterior surface having an outwardly extending concentric shoulder; and
   wherein said shoulder of said inner body portion engages said shelf of said outer body portion to limit further longitudinal movement of said inner body portion relative to said outer body portion.

6. The injection nozzle as set forth in claim 1, said first material comprising beryllium copper.

7. The injection nozzle as set forth in claim 1, said first material comprising carbide.

8. The injection nozzle as set forth in claim 1, said first material comprising tungsten carbide.

9. The injection nozzle as set forth in claim 1, said second material comprising steel.

10. The injection nozzle as set forth in claim 1, said second material comprising Ti/Zr-Carbide.

11. The injection nozzle as set forth in claim 1, said second material comprising an iron-based steel alloy.

12. The injection nozzle as set forth in claim 1, said outer body portion further comprising a fastening portion, said fastening portion removably fastening said injection nozzle to a housing of a hot runner injection nozzle.

13. The injection nozzle as set forth in claim 12, said fastening portion comprising a threaded portion.

14. The injection nozzle as set forth in claim 1, said outer body portion comprising a flange, said flange sealing and aligning said injection nozzle with a mold.

15. An injection molding device comprising:
   a mold with a gate area; and
   a nozzle assembly for contacting said gate area, said nozzle assembly comprising:
   a nozzle body having a first end and a second end;

an inner body portion comprising a first material and including a melt outlet and a melt channel communicating with said melt outlet, said melt outlet and said melt channel removably aligned with said gate area and through which melt material passes, said inner body portion having an inlet face opposite said melt outlet;

an outer body portion comprising a second material, said outer body portion having a seal face at a first end and a seal surface at a second end for sealing with the nozzle body, said outer body portion inducing a compressive force on said inner body portion at least during operation of said injection molding device;

a plane of said inlet face of said inner body portion intersecting said outer body portion, resulting in no portion of said first end of said inner body portion extending beyond said seal face of said outer body portion; and said first material having thermal conduction and expansion coefficients greater than thermal conduction and expansion coefficients of said second material.

16. The injection molding device as set forth in claim 15, wherein:

said compressive force is induced through an interference fit between said inner and said outer body portions at room temperature; and said inlet face of said inner body portion and said seal face of said outer body portion are generally coplanar.

17. The injection molding device as set forth in claim 15, wherein:

said compressive force is induced through a shrink fit between said inner and said outer body portions at room temperature; and said inlet face of said inner body portion and said seal face of said outer body portion are generally coplanar.

18. The injection molding device as set forth in claim 15, wherein:

said inlet face of said inner body portion is recessed from said seal face of said outer body portion; and said compressive force is induced through relative thermal expansion between said inner and said outer body portions during operation of said injection molding device.

19. The injection molding device as set forth in claim 18, wherein said outer body portion further comprises an inner surface having an inwardly extending concentric shelf;

said inner body portion further comprising an exterior surface having an outwardly extending concentric shoulder; and wherein said shoulder of said inner body portion engages said shelf of said outer body portion to limit further longitudinal movement of said inner body portion relative to said outer body portion.

20. The injection molding device as set forth in claim 15, said first material comprising beryllium copper.

21. The injection molding device as set forth in claim 15, said second material comprising steel.

22. The injection molding device as set forth in claim 15, said second material comprising an iron-based steel alloy.

23. The injection molding device as set forth in claim 15, further comprising a nozzle housing and said outer body portion further comprising a fastening portion, said fastening portion removably fastening said nozzle assembly to said housing.

24. The injection molding device as set forth in claim 15, said fastening portion comprising a threaded portion.

25. The injection molding device as set forth in claim 1, said outer body portion comprising a flange, said flange sealing and aligning said nozzle assembly with said gate area.

* * * * *